("12") United States Patent  (10) Patent No.: US 6,708,805 B2
Samejima et al.                (45) Date of Patent:     Mar. 23, 2004

(54) RIDING TRACTOR FOR SUPPORTING A MOWER UNIT

(75) Inventors: Kazuo Samejima, Kaizuka (JP); Akira Minoura, Osaka (JP); Yoshikazu Togoshi, Osaka (JP); Osami Fujiwara, Kishiwada (JP)

(73) Assignee: Kubota Corporation, Osaka (JP)

( * ) Notice: Subject to any disclaimer, the term of this patent is extended or adjusted under 35 U.S.C. 154(b) by 6 days.

(21) Appl. No.: 10/077,585

(22) Filed: Feb. 15, 2002

(65)        Prior Publication Data

US 2003/0046915 A1 Mar. 13, 2003

(30)    Foreign Application Priority Data

Sep. 7, 2001   (JP) ........................................ 2001-271647

(51) Int. Cl.⁷ ................................................. B60T 7/04
(52) U.S. Cl. ..................... 192/13 A; 180/6.34
(58) Field of Search ............................. 180/6.32, 6.34; 56/11.3; 192/13 A, 13 R, 99 S

(56)           References Cited

U.S. PATENT DOCUMENTS 4,694,942 A  * 9/1987  Ogano et al. ............. 192/13 A
5,238,267 A  * 8/1993  Hutchison et al. ........... 280/781
6,164,396 A  * 12/2000 Matsufuji ................... 180/6.34

FOREIGN PATENT DOCUMENTS

JP        2001063536        3/2001

* cited by examiner

*Primary Examiner*—Christopher P. Schwartz
(74) *Attorney, Agent, or Firm*—Webb Ziesenheim Logsdon Orkin & Hanson, P.C.

(57)           ABSTRACT

A riding tractor in which engine output is transmitted to a running device through a hydrostatic stepless transmission. The tractor has a braking device for acting on the running device, a first brake operating device and a second brake operating device operable independently of each other for operating the braking device, and a brake control device for linking control displacements from the first brake operating device and the second the brake operating device to the brake device. The brake control device includes a mechanism movable with the operating devices to maintain the second brake operating device in an inoperative position when the first brake operating device operates the brake device, and a brake lock mechanism switchable between a locking state for locking the brake device to a braking position, and a lock release state, the brake lock mechanism maintaining the lock release position when the first brake operating device operates the brake device, and automatically switching to the locking state when the second brake operating device operates the brake device to the braking position.

13 Claims, 12 Drawing Sheets

RIDING TRACTOR FOR SUPPORTING A MOWER UNIT

BACKGROUND OF THE INVENTION

1. Field of the Invention

This invention relates to a riding tractor for supporting a mower unit, in which engine output is transmitted to a traveling device through a hydrostatic stepless transmission.

2. Description of the Related Art

The above riding tractor is movable back and forth and at varied speeds simply by operating the hydrostatic stepless transmission. This tractor is particularly suited for use as a grass cutting machine.

This type of grass cutting machine is stopped running with the hydrostatic stepless transmission placed in neutral state. On an inclined ground, however, the traveling device could rotate and move the machine inadvertently.

To cope with such a situation, a tractor disclosed in Japanese Patent Laying-Open Publication 2001-63536, for example, has a brake device for acting on wheels constituting a traveling device, and a brake pedal and a brake lever for operating the brake device. The brake lever is maintained in an operative position to maintain the brake device in an operative state. The brake pedal is operable to apply traveling brakes to the traveling device. The brake lever is operable to apply parking brakes to the traveling device. The brake lever for applying the parking brakes has a latch mechanism of the guide groove type. The driver may set the brake lever to a groove for parking to maintain the brake device in the operative state.

There are many advantages where the two brake control tools are provided for operating the brake device, but not a few inconveniences are encountered. When the tractor is stopped or parked on an inclined ground, for example, the tractor may be started, while preventing an inadvertent movement thereof, by shifting the stepless transmission from neutral to a driving state while applying the traveling brakes to the traveling device and adjusting the braking force, depending on an angle of inclination. In the prior art, the braking force must be adjusted by operating the brake pedal. This often results in difficulties in making subtle adjustments.

It may also be disadvantageous in terms of structure and operation to maintain the control lever with the latch mechanism such as a guide groove each time parking brakes are applied.

SUMMARY OF THE INVENTION

An object of this invention is to enable brake adjustments to be carried out with ease for applying parking brakes and traveling brakes, in a riding tractor having two brake control tools for one brake device.

Another object of this invention is to a riding tractor for supporting a mower unit, in which a brake pedal and a brake lever acting as brake control tools are hardly obstructive to boarding, alighting or driving.

The above objects are fulfilled, according to this invention, by a riding tractor in which engine output is transmitted to a running device through a hydrostatic stepless transmission, comprising a braking device for acting on the running device, a first brake operating device and a second brake operating device operable independently of each other for operating the braking device, and a brake control device for linking control displacements from the first brake operating device and the second the brake operating device to the brake device, the brake control device including a mechanism movable with the operating devices to maintain the second brake operating device in an inoperative position when the first brake operating device operates the brake device, and a brake lock mechanism switchable between a locking state for locking the brake device to a braking position, and a lock release state, the brake lock mechanism maintaining the lock release position when the first brake operating device operates the brake device, and automatically switching to the locking state when the second brake operating device operates the brake device to the braking position.

When the second brake operating device is operated to actuate the brake device, the brake lock mechanism automatically switches to the locking state for locking the brake device to its operative position. In this state, the second brake operating device is allowed to take braking action. The brake may be applied with a foot when the driver's hands are used in braking the tractor while controlling the stepless transmission to prevent the tractor from slipping on an inclined ground. Since the first brake operating device moves in response to the second brake operating device, when a parking brake is applied, the first brake operating device may be moved to a position not obstructive to the driver in boarding or alighting from the driving platform.

When the first brake operating device is operated, the brake device may be operated without being locked to the braking position since the brake lock mechanism is maintained in the lock release state.

Thus, a traveling brake may be applied by the first brake operating device. When controlling the stepless transmission and the brake device at the same time, the stepless transmission may be controlled with one hand, the other hand may be used to apply the brake and effect a subtle adjustment of the braking force with ease.

When the traveling brake is applied in this way and the second brake operating device moves in response to the first brake operating device, the driver may have to take care to avoid his or her foot contacting the second brake operating device. However, since the second brake operating device is maintained in the inoperative position, the traveling brake may be applied free of the above inconvenience.

Where the second brake operating device is the foot pedal type for applying a parking brake, the parking brake may easily be applied with a foot even when the hands are used in controlling the stepless transmission or the like. In this case, the first brake operating device may be a hand-operated lever to be rockable to a position not obstructive to the driver so that the driver may board or alight from the driving platform.

In a preferred embodiment of this invention, the brake lock mechanism is releasable by a control displacement of the first brake operating device.

By releasing the brake lock mechanism with the first brake operating device, the brake device unlocked from the operative position. Then, the first brake operating device is operable to apply, release and adjust the braking force of the brake device. As a result, only by operating the first brake operating device, the parking brake may be released and the tractor may be started while controlling the traveling brake.

In another preferred embodiment of this invention, the first brake operating device is a brake lever for applying a traveling brake to the running device, and the second brake operating device is a brake pedal for applying a parking brake to the running device.

With the above construction, the parking brake is applied by operating the brake pedal. The parking brake may be applied with a foot when the driver's hands are used in braking the tractor while controlling the stepless transmission to prevent the tractor from slipping on an inclined ground.

Since the traveling brake is applied by operating the brake lever, when controlling the stepless transmission and the brake device at the same time, the stepless transmission may be controlled with one hand, the other hand may be used to apply the brake and effect a subtle adjustment of the braking force with ease.

Thus, even when the hands are used in controlling the stepless transmission and the like, the tractor may be parked by applying the parking brake easily with a foot. Further, when starting the tractor on an inclined ground, for example, the stepless transmission may be controlled with one hand, the other hand may be used to apply the brake and effect a subtle adjustment of the braking force with ease, to make a smooth start.

Other features and advantages of this invention will be apparent from the following description of the embodiment to be taken with reference to the drawings.

DESCRIPTION OF THE PREFERRED EMBODIMENTS

Figure 1:
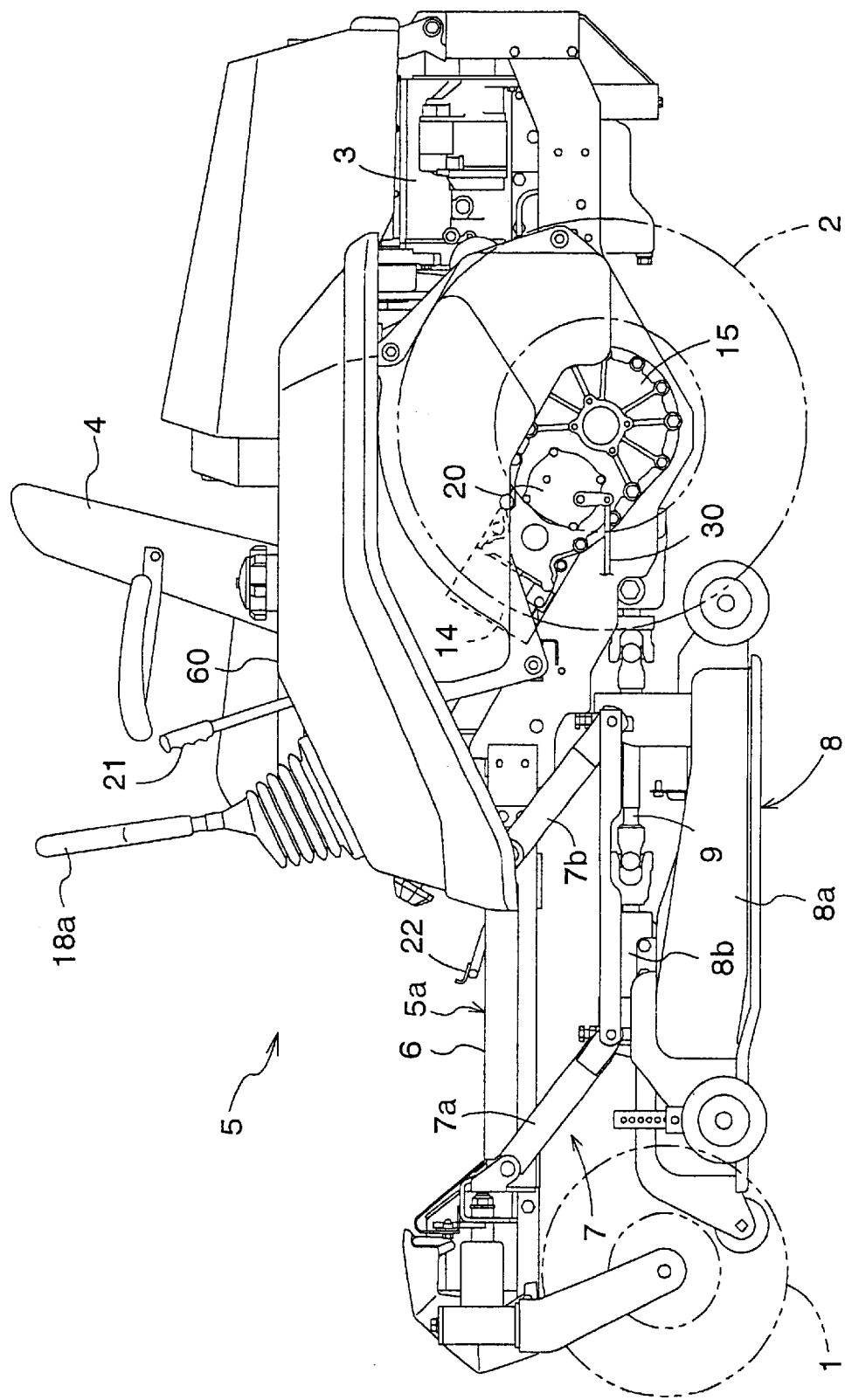
FIG. 1 is a side elevation of a riding tractor for supporting a mower unit.
Figure 2:
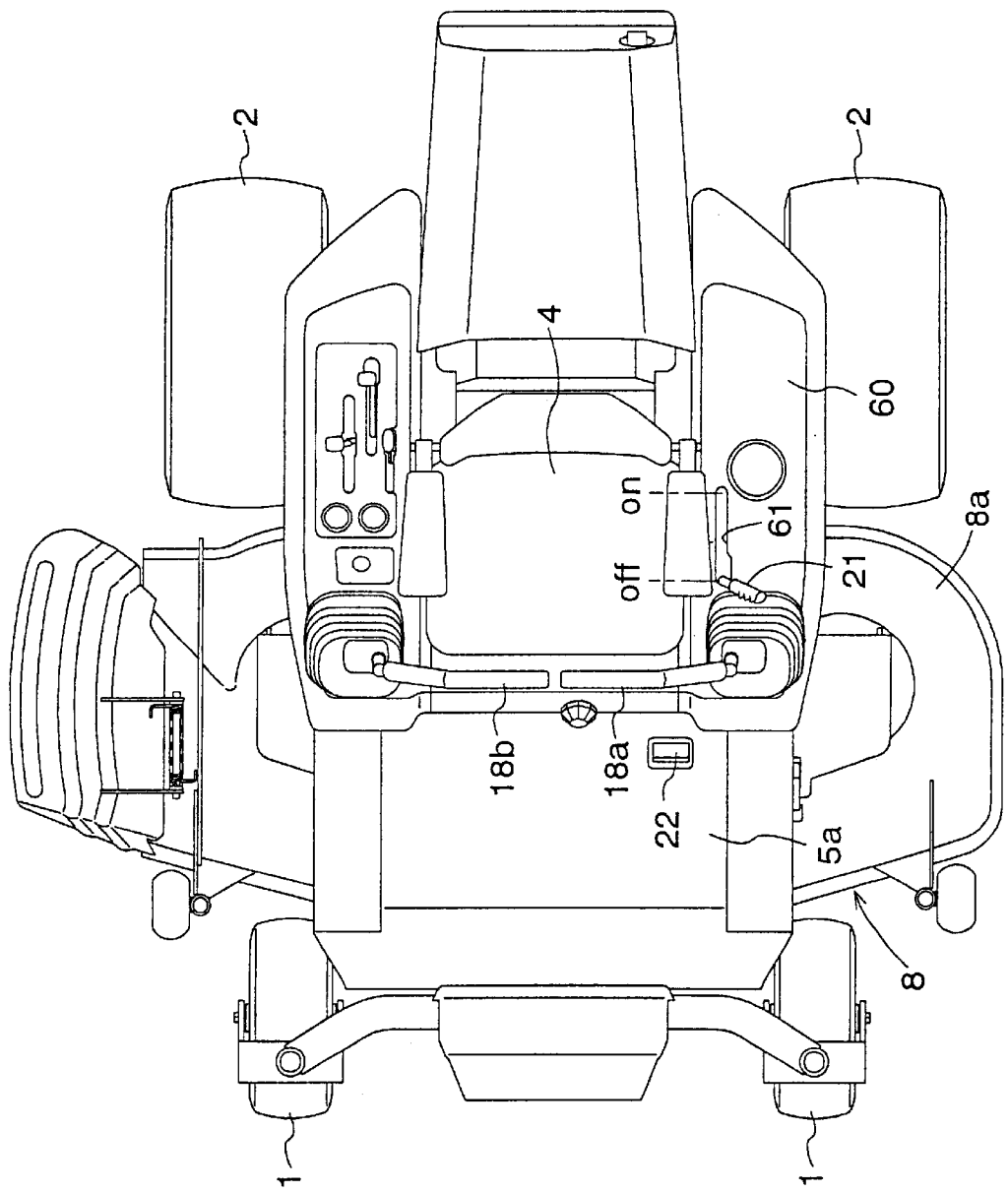
FIG. 2 is a plan view of the riding tractor.

FIGS. 1 and 2 show a riding tractor for supporting a mower unit to be used mainly for cutting lawn. The tractor includes a pair of left and right caster type front wheels 1, a pair of left and right rear drive wheels 2 supporting a vehicle body. A motor section having an engine 3 is disposed in a rear end region of the vehicle body. A driving platform 5 having a driver's seat 4 is disposed forwardly of the motor section, and formed on a vehicle body frame 6. A grass cutting device 8 is connected to the body frame 6 between the front wheels 1 and rear wheels 2 through a link mechanism 7 having front pivot links 7a and rear pivot links 7b. Torque is transmitted from the engine 3 through a rotary shaft 9 to an input 8b disposed on an upper surface side of a mower deck 8a of the grass cutting device 8. The grass cutting device 8 may be raised and lowered by vertically swinging the mechanism 7 relative to the body frame 6.

Figure 3:
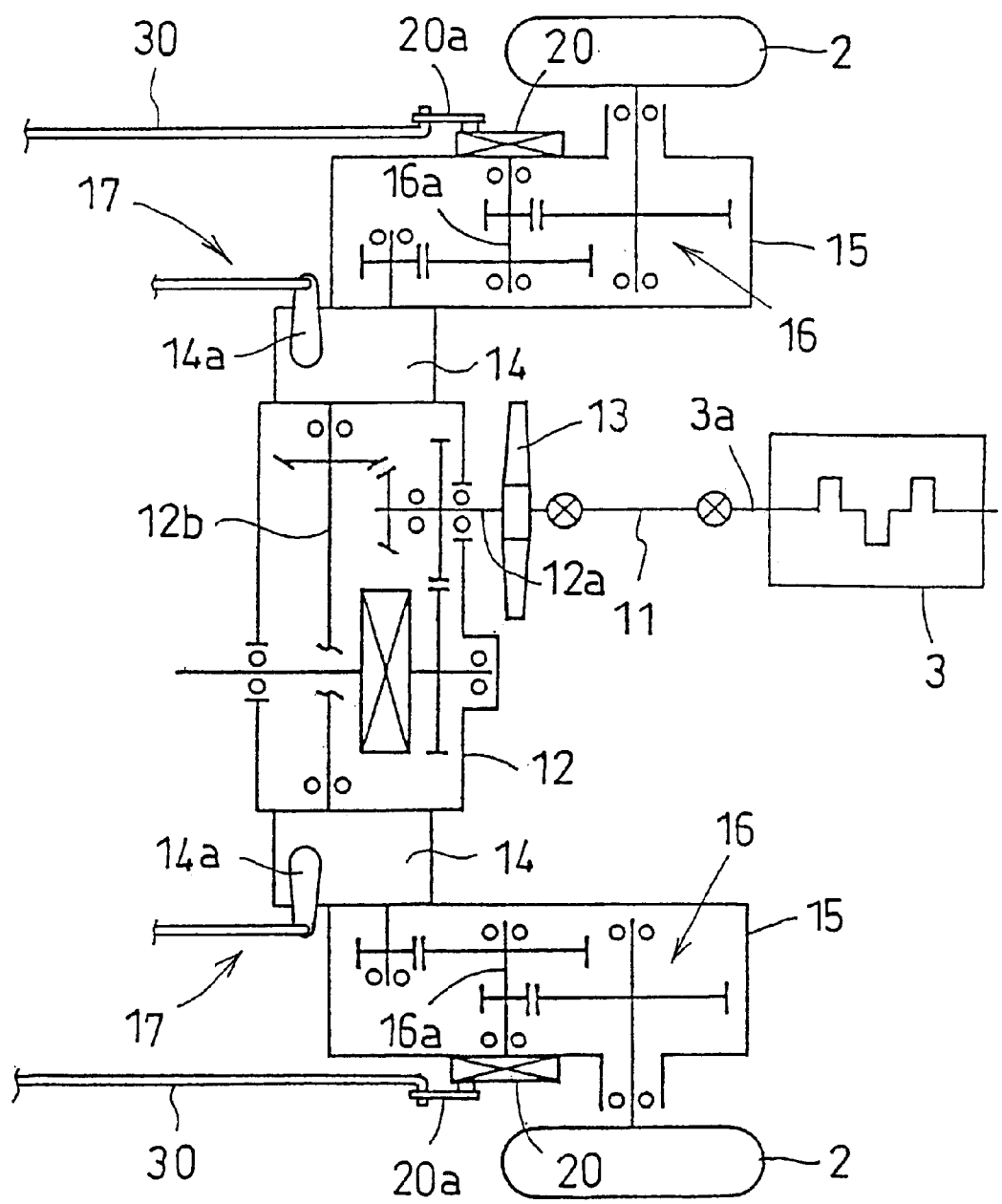
FIG. 3 is a schematic view of a transmission structure.

Output of the engine 3 is transmitted to the left and right rear wheels 2 through a transmission structure shown in FIG. 3.

Specifically, torque of an output shaft 3a of engine 3 is transmitted through a rotary shaft 11 to an input shaft 12a, with a cooling fan 13 mounted thereon, of a transmission case 12 disposed in the rear region of the vehicle body between the left and right rear wheels 2. Torque of an output shaft 12b of transmission case 12 is transmitted to input portions of stepless transmissions 14 connected to opposite sides of transmission case 12. Torque output of the left stepless transmission 14 is transmitted to a left rear axle through a gear type transmission mechanism 16 mounted in a transmission case 15 for the left rear wheel. Torque output of the right stepless transmission 14 is transmitted to a right rear axle through a gear type transmission mechanism 16 mounted in a transmission case 15 for the right rear wheel.

Each of the left and right stepless transmissions 14 includes a hydraulic pump of the variable displacement type having an input shaft interlocked to the output shaft 12b of transmission case 12, and a hydraulic motor driven by hydraulic pressure from the hydraulic pump to transmit torque output to the gear type transmission mechanism 16. Each stepless transmission 14 is a hydrostatic stepless transmission switchable by changing of swash plate angle of the hydraulic pump to a forward drive state, neutral and a backward drive state. In the forward drive state, the stepless transmission 14 switches the torque from the engine 3 to forward drive, changes its speed steplessly, and transmits the drive to the rear wheel 2 through the gear type transmission mechanism 16. In the backward drive state, the stepless transmission 14 switches the torque from the engine 3 to backward drive, changes its speed steplessly, and transmits the drive to the rear wheel 2 through the gear type transmission mechanism 16. In the neutral state, the stepless transmission 14 stops the hydraulic motor to stop driving the rear wheel 2.

Figure 4:
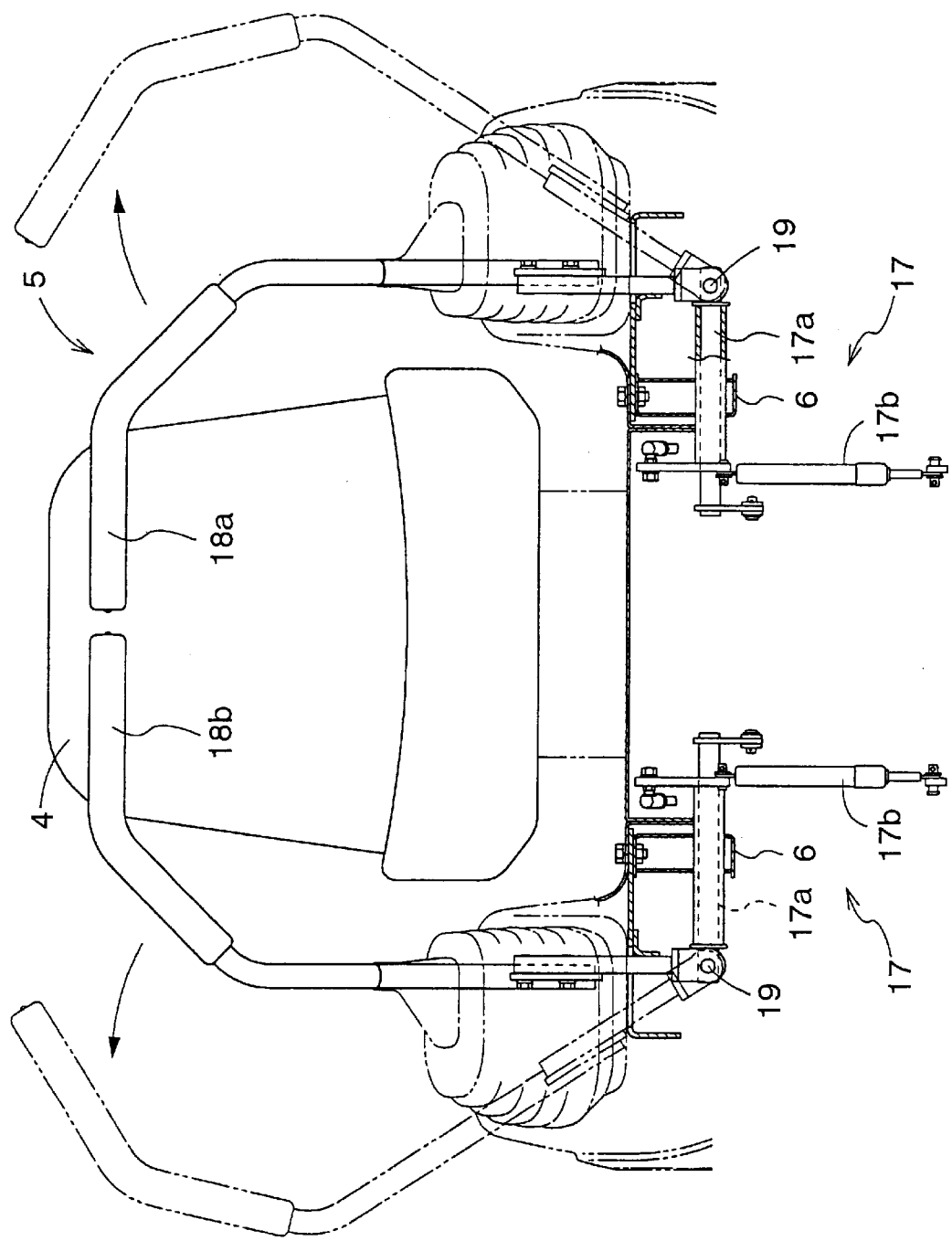
FIG. 4 is a front view showing traveling control levers arranged on a driving platform.
Figure 5:
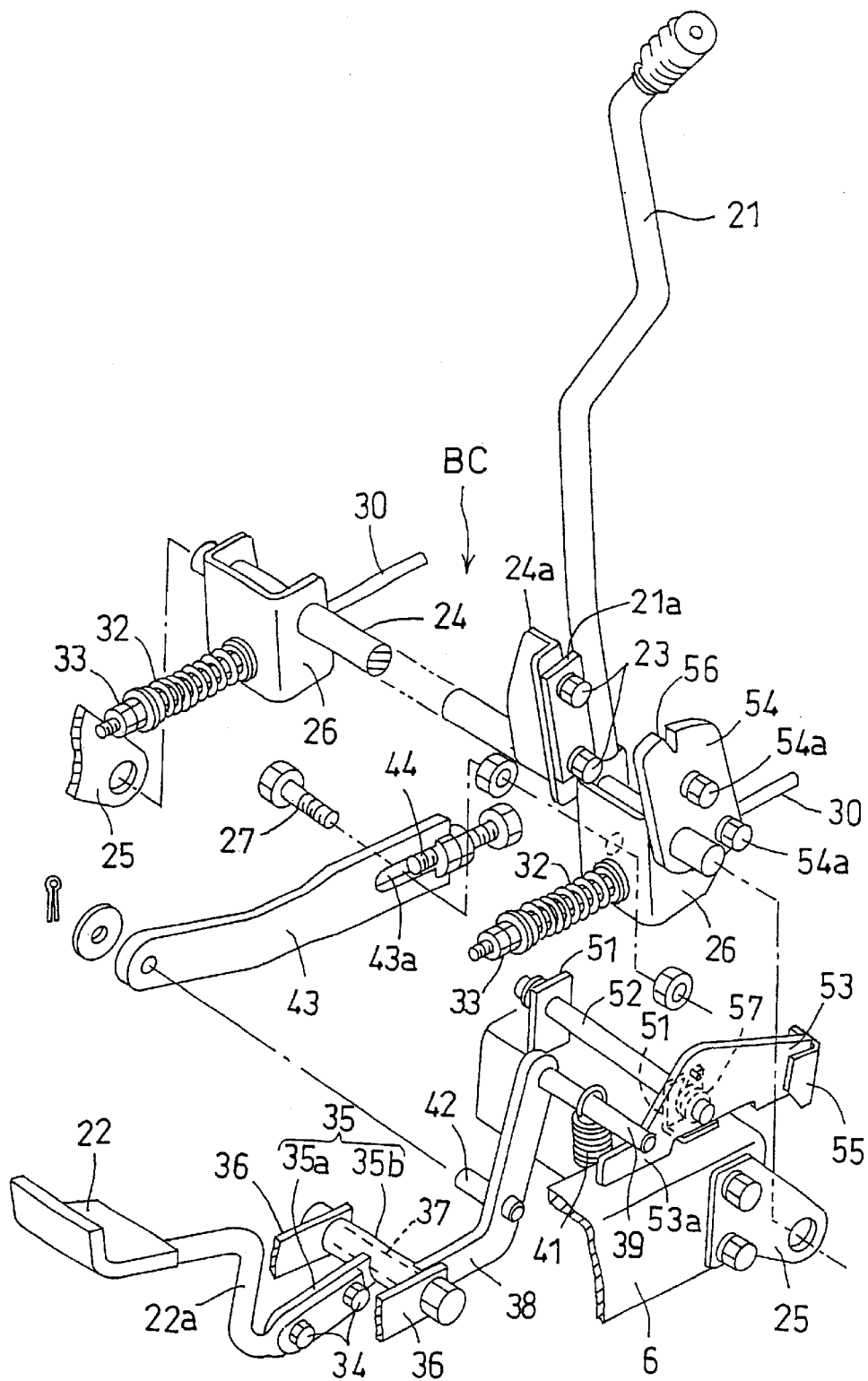
FIG. 5 is an exploded perspective view of part of a brake control device.
Figure 6:
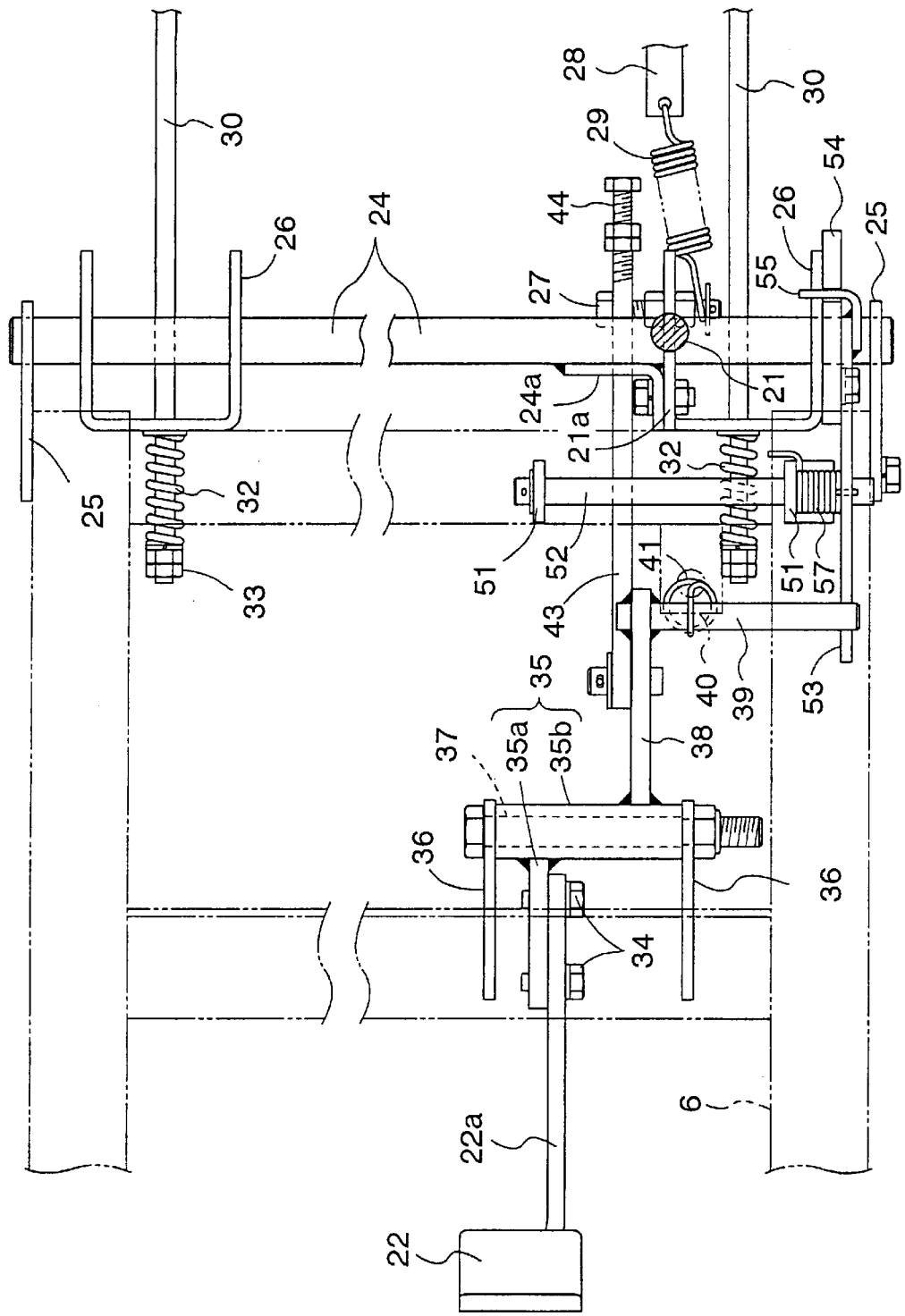
FIG. 6 is a plan view of part of the brake control device.
Figure 7:
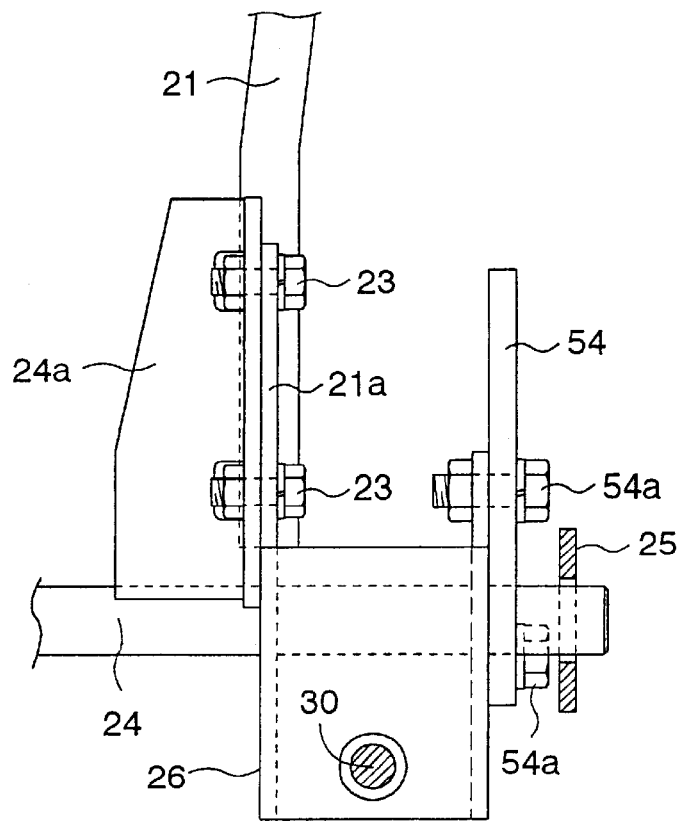
FIG. 7 is a front view of a brake control element of the brake control device.
Figure 8:
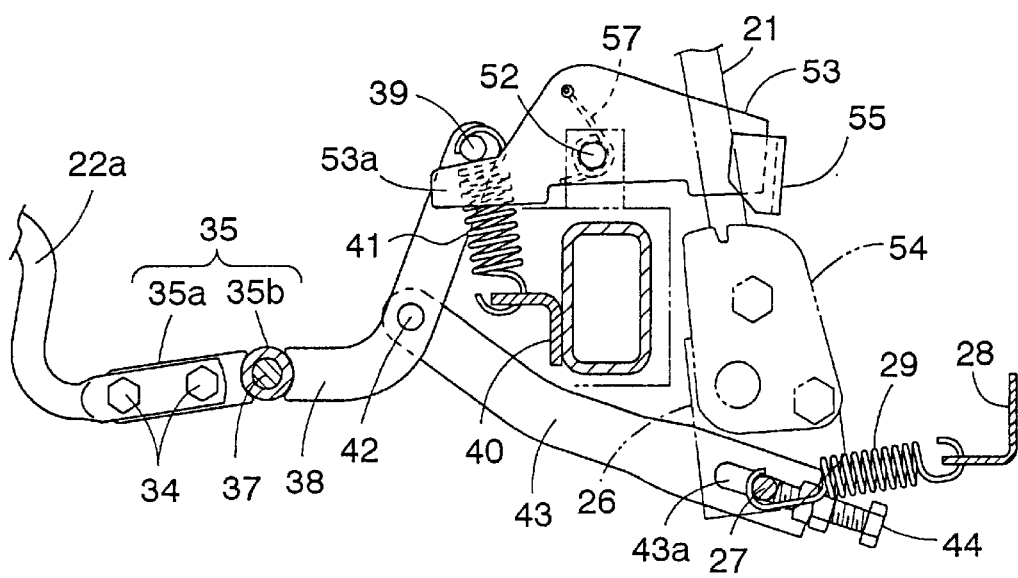
FIG. 8 is a side view showing a slot portion of the brake control device.

Referring to FIGS. 3 and 4, the driving platform 5 includes a left running lever 18a and a right running lever 18b arranged at opposite sides of the driver's seat 4. The left running lever 18a is interlocked at a base end thereof through a link type interlocking mechanism 17 to a pivotable speed control element 14a of the stepless transmission 14 for the left rear wheel 2. The right running lever 18b is interlocked at a base end thereof through a link type interlocking mechanism 17 to a pivotable speed control element 14a of the stepless transmission 14 for the right rear wheel 2. Each of the running levers 18a and 18b are rockable longitudinally of the vehicle body about a rotary transmission shaft 17a acting also as a lever support shaft to control traveling, steering and stopping of the tractor.

That is, the two running levers 18a and 18b are rockable longitudinally of the vehicle body about the axis of the rotary transmission shafts 17a to shift the stepless transmission 14 for the left rear wheel and the stepless transmission 14 for the right rear wheel separately. Then, both the left and right rear wheels 2 are driven at the same speed forward or backward whereby the tractor travels straight forward or backward. The traveling direction of the tractor changes when the left and right rear wheels 2 are driven in opposite directions or when the rear wheels 2 are both driven forward or backward but at different rotating speeds. The tractor stops traveling when both left and right rear wheels 2 are stopped.

Each link type interlocking mechanism 17 includes a damper 17b having a tube connected to the rotary transmission shaft 17a. The damper 17b suppresses transmission to the running lever 18a or 18b of vibration generated at the control element 14a of stepless transmission 14.

As shown in FIG. 4, each of the left running lever 18a and right running lever 18b is pivotably connected at the base end to the rotary transmission shaft 17a by a connecting pin 19 extending perpendicular to the rotational axis of rotary transmission shaft 17a.

That is, the left and right running levers 18a and 18b are tiltable transversely of the vehicle body by rocking about the axes of connecting pins 19. As shown in solid lines in FIG. 4, both running levers 18a and 18b may be erected to have proximal portions thereof extending perpendicular to the rotary transmission shaft 17a, whereby grips of the two running levers 18a and 18b lie close to each other. In this state, the driver may hold the grips of the two running levers 18a and 18b separately with both hands to operate the running levers 18a and 18b separately, or may hold the grips of the two running levers 18a and 18b separately with one hand to operate the running levers 18a and 18b together such as when starting the tractor on an inclined ground while applying brakes besides controlling the stepless transmissions 14. As shown in two-dot chain lines in FIG. 4, the left and right running levers 18a and 18b are may be tilted laterally outwardly of the driver's seat 4. Then, the drier may move through a space between the grips of the two running levers 18a and 18b wide apart from each other, to sit on the driver's seat 4 or leave the driver's seat 4.

As shown in FIG. 3, for example, the transmission case 14 for the left rear wheel and the transmission case 14 for the right rear wheel have brake devices 20.

Figure 9:
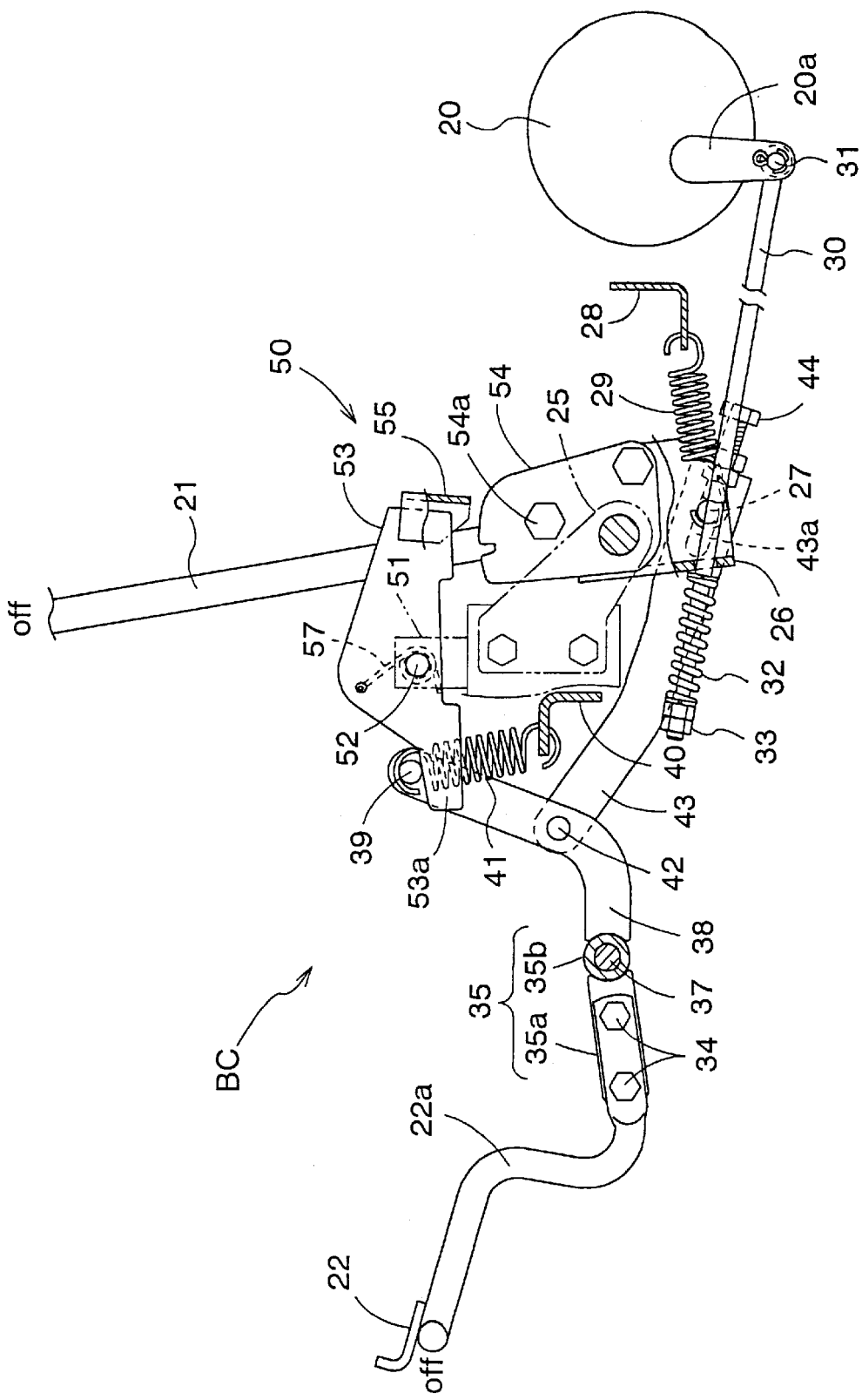
FIG. 9 is a side view of the brake control device in a brake release state.

Each brake device 20 brakes the rear wheel 2 by applying a friction brake to a rotary transmission shaft 16a of the gear type transmission mechanism 16 in the transmission case. Each brake device 20 is operable by a brake control device BC including, as shown in FIG. 2, for example, a brake lever 21 acting as a first brake control lever disposed at the left side of the driver's seat 4 to be operable by hand, a brake pedal 22 acting as a second brake control lever disposed in a left rear position on a foot-rest of the driving platform 5 to be depressible by foot, and a brake lock mechanism 50 as shown in FIG. 9. The brake control apparatus BC is constructed as shown in FIGS. 5 through 9.

The brake lever 21 has a mounting plate 21a secured to a proximal portion thereof. The mounting plate 21a is connected to a lever support 24a by connecting bolts 23. The lever support 24a is rotatable with a rotary interlocking shaft 24 acting also as a lever support shaft extending transversely of the vehicle body. Thus, the brake lever 21 is supported by left and right lever support brackets 25 of the body frame 6 to be rockable about the axis of the rotary interlocking shaft 24. Further, a brake control element 26 of U-shaped section is secured at an upper end thereof to the proximal portion of the brake lever 21 to be rockable with the brake lever 21 about the axis of rotary interlocking shaft 24. A lever return spring 29 is mounted between an interlocking pin 27 in the form of a bolt of the brake control element 26 and a spring hook 28 of the body frame 6. The brake lever 21 is thereby biased to return automatically to a release position "off".

A brake rod 30 has a forward end slidably extending through a front side of the brake control element 26 connected directly to the brake lever 21. The rear end of the brake rod 30 is relatively pivotably connected by a connecting pin 31 to a swing arm type control element 20a of the brake device 20 for the left rear wheel. An end portion of the brake rod 30 projecting forward from the brake control element 26 supports a stroke adjusting spring 32 and a spring adjusting screw 33 acting also as a spring stopper for receiving one end of the spring 32. The brake control element 26 and brake rod 30 are connected so that the brake rod 30 may be pulled forward by the brake control element 26. The stroke adjusting spring 32 is elastically deformable to enable a slight stroke control of the brake lever 21 and brake pedal 22 after the control element 20a of brake device 20 reaches a brake applying stroke end.

The rotary interlocking shaft 24 has, at an end thereof rightward of the vehicle body, a brake control element 26 having the same shape as the left brake control element 26 and rotatable with the rotary interlocking shaft 24. A brake rod 30 has a forward end slidably extending through a front side of this brake control element 26, and a rear end relatively pivotably connected by a connecting pin 31 to a swing arm type control element 20a of the brake device 20 for the right rear wheel. An end portion of the brake rod 30 projecting forward from the brake control element 26 supports a stroke adjusting spring 32 and a spring adjusting screw 33 which are similar to those mounted on the left brake rod 30. The brake control element 26 and brake rod 30 are connected so that the brake rod 30 may be pulled forward by the brake control element 26. Thus, the brake rod 30 may be pulled forward by the brake control element 26, and a slight stroke control of the brake lever 21 and brake pedal 22 may be made after the control element 20a of brake device 20 reaches a brake applying stroke end.

The brake pedal 22 has a pedal arm 22a connected by connecting bolts 34 to an arm 35a of a pedal support 35. The body frame 6 supports, through a pair of right and left support brackets 36, a pedal support shaft 37 extending transversely of the vehicle body. The brake pedal 22 is mounted on the pedal support shaft 37 through the pedal support 35 to be pivotable about the axis of the pedal support shaft 37. An interlocking arm 38 extends rearward from a mounting tube portion 35b of pedal support 35 relatively rotatably mounted on the pedal support shaft 37. The interlocking arm 38 has a lock checking element 39 in the form of a rod. A pedal return spring 41 extends between the lock checking element 39 and a spring hook 40 on the body frame 6. The brake pedal 22 is thereby biased to return to the release position "off" automatically.

An interlocking plate 43 is connected at a forward end thereof to an intermediate position of the interlocking arm 38 to be relatively pivotable through a connecting pin 42. The interlocking plate 43 is relatively pivotably connected at a rear end thereof by the interlocking pin 27 to the brake control element 26 connected directly to the brake lever 21. The interlocking plate 43 defines a pin bore 43a in the form of a slot for receiving the interlocking pin 27 to be slidable therein. This elongate pin bore 43a is formed of a cutout formed in the interlocking plate 43 and an adjusting bolt 44 disposed in an opening end of the cutout. The adjusting bolt 44 is used to adjust a position of the interlocking plate 43 for contacting the interlocking pin 27 so that the brake lock mechanism 50 performs locking action when the brake pedal 22 is depressed to operate the brake devices 20.

The brake lock mechanism 50 includes a lock link 53 pivotably supported in an intermediate position thereof through a connecting pin 52 by a pair of right and left link support brackets 51 fixed to the body frame 6, and a lock plate 54 fixed connecting bolts 54a to the brake control element 26 connected directly to the brake lever 21.

Figure 11:
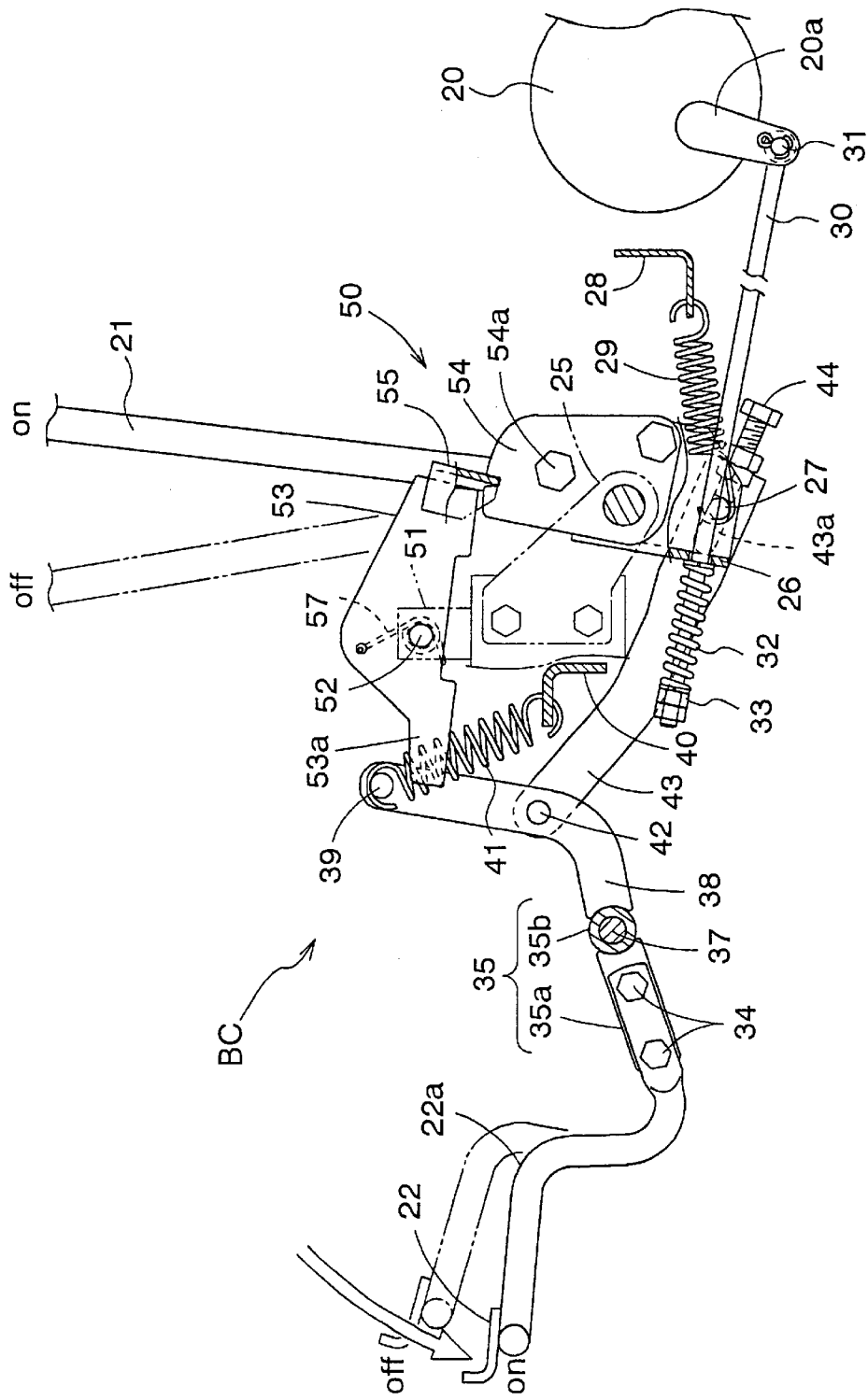
FIG. 11 is a side view of the brake control device with a brake pedal operated.
Figure 13:
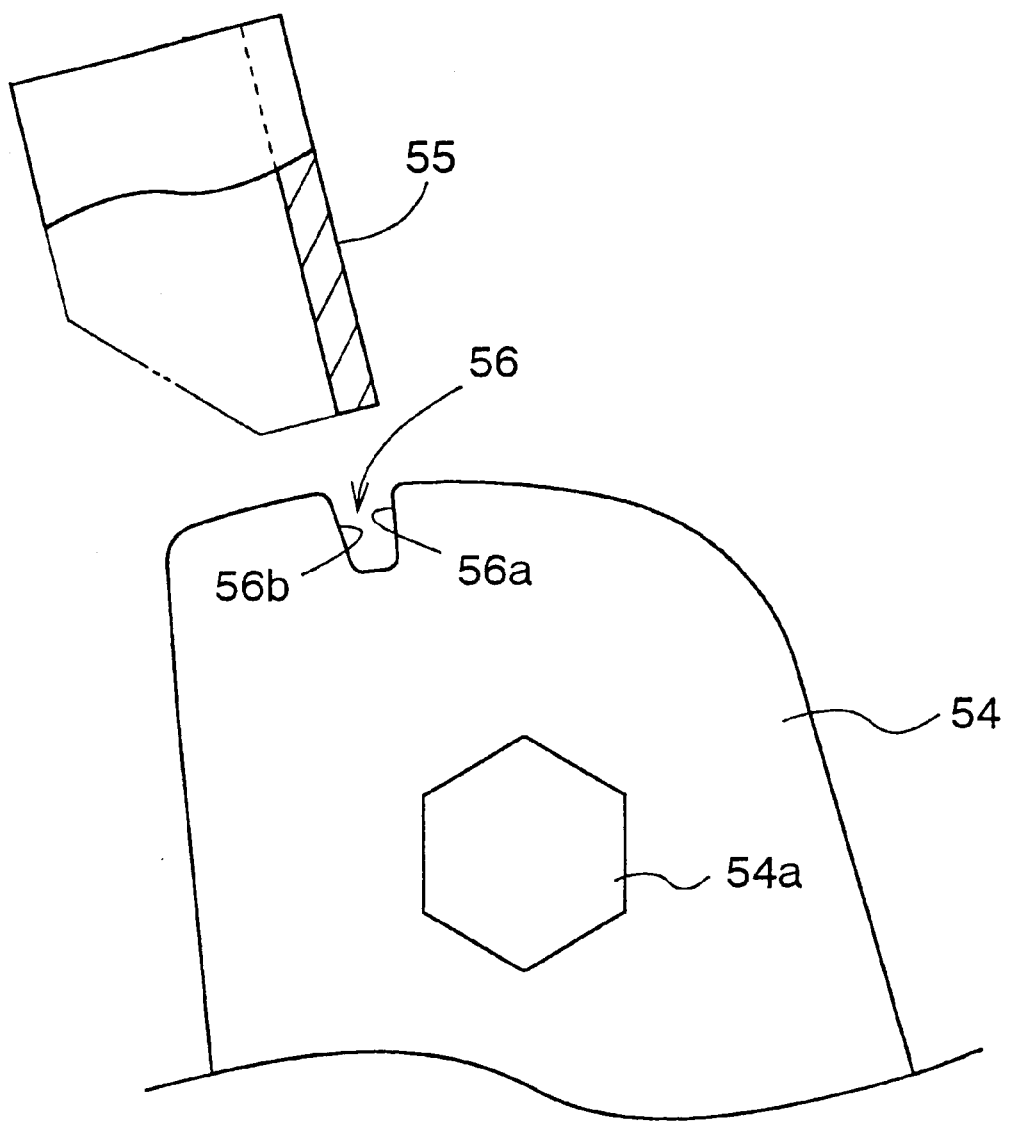
FIG. 13 is a side view showing a cutout of a lock plate.

When, as shown in FIG. 11, the lock link 53 pivots about the axis of connecting pin 52, a locking pawl 55 in the form of a bent plate secured to one free end of lock link 53 enters a cutout 56 formed in the lock plate 54 as shown in FIG. 13. Then, the lock link 53 acts as a stopper on the lock plate 54 to retain the brake control elements 26 in a brake applying position against the self-restoring force of brake devices 20 and the lever return spring 29. Thus, the brake lock mechanism 50 assumes a locking position for retaining the control element 20a of brake device 20 for the left rear wheel in a brake applying position through the left brake control element 26 and brake rod 30, and retaining the control element 20a of brake device 20 for the right rear wheel in a brake applying position through the right brake control element 26 and brake rod 30, thereby retaining the two brake devices 20 in the operative state. When, from this state, the locking pawl 55 of lock link 53 moves out of the cutout 56 of lock plate 54, the lock link 53 terminates the stopper action on the lock plate 54. As a result, the brake lock mechanism 50 assumes an unlock position for canceling the retention of the control element 20a of each brake device 20 to release the brake device 20.

Figure 10:
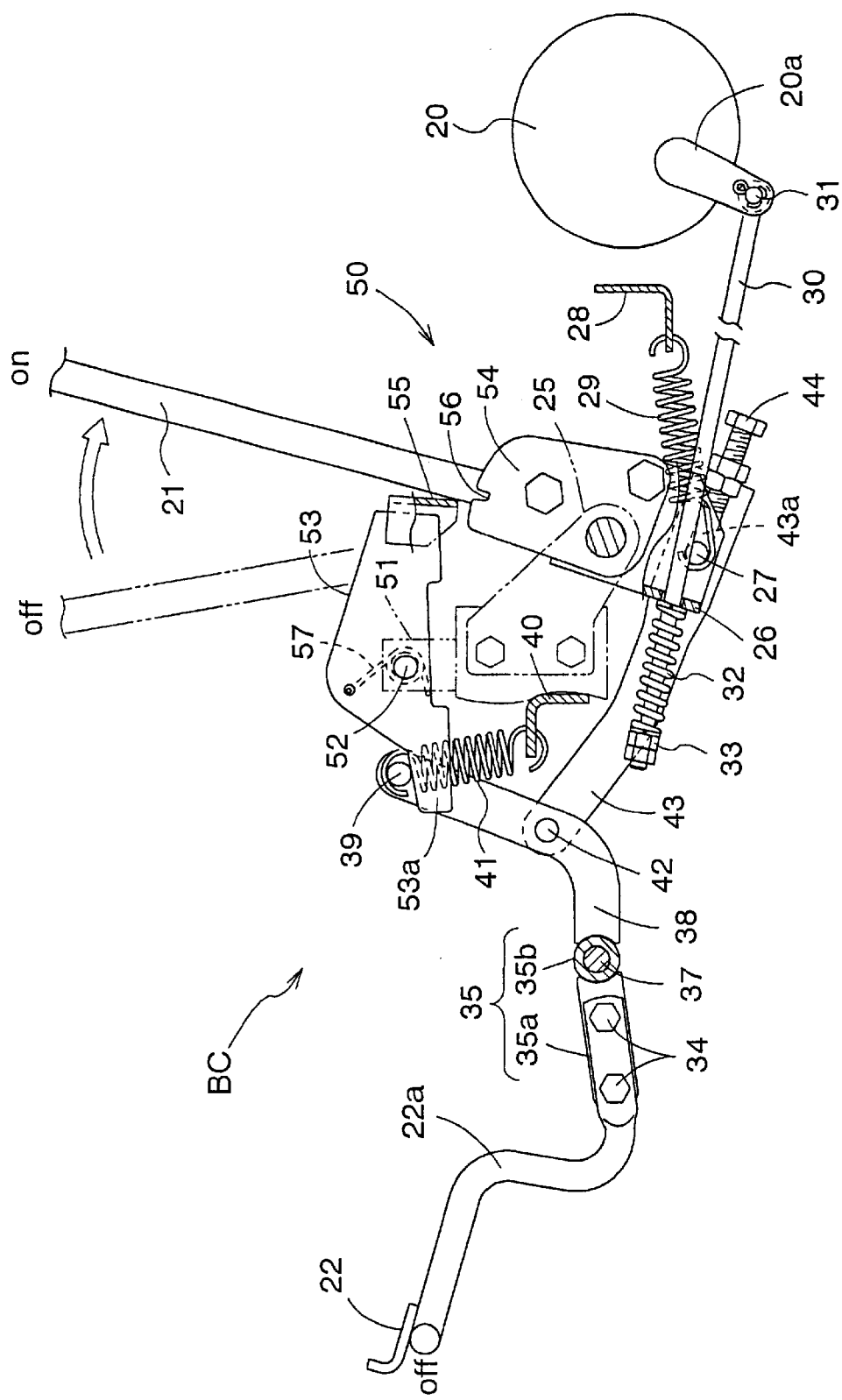
FIG. 10 is a side view of the brake control device with a brake lever operated.

The lock link 53 is biased to pivot in the direction to engage the lock plate 54 by a lock spring 57 having a coil portion thereof mounted on the connecting pin 52, one end connected to the lock link 53 and the other end connected to the link support bracket 51. When the lock checking element 39 is pressed by a release portion 53a of the lock link 53, the lock link 53 is pivotable away from the lock plate 54 against the lock spring 57. The pedal return spring 41 applies a biasing force to provide this state. The releasing force applied from the pedal return spring 41 to the lock link 53 is set stronger than the engaging force applied from the lock spring 57 to the lock link 53. When, as shown in FIG. 11, the brake pedal 22 is depressed to an operative position "on", the lock checking element 39 moves away from the release portion 53a of the lock link 53 to remove the pressure applied to the release portion 53a. As the brake control elements 26 are operated by the brake pedal 22 to the brake applying position, the lock link 53 pivots under the biasing force of lock spring 57 to engage the lock plate 54. When, as shown in FIG. 10, the brake pedal 22 is in the release position "off", the lock checking element 39 under the force of the pedal return spring 41 retains the lock link 53 in the disengaged position against the lock spring 57. When the brake pedal 22 is in the release position "off", the lock link 53 does not engage the lock plate 54 even if the brake control elements 26 are operated to the brake applying position.

Figure 12:
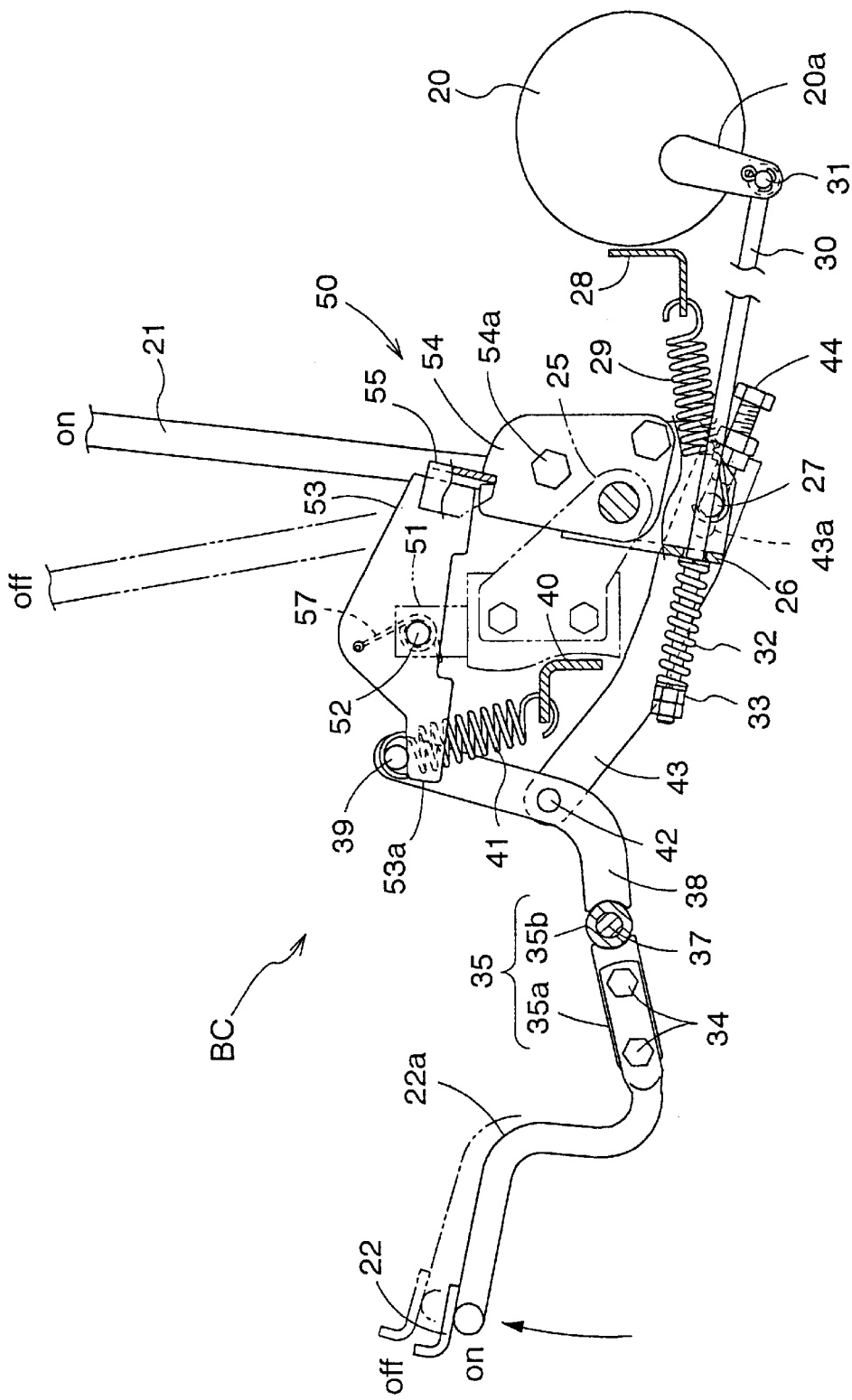
FIG. 12 is a side view of the brake control device in a state of applying parking brakes.

After the lock link 53 engages the lock plate 54, as shown in FIG. 12, the lock link 53 keeps applying the stopper action to the lock plate 54 even if the lock checking element 39 is pressed on the release portion 53a by the force of pedal return spring 41. This state is maintained by an engaging force occurring between the locking pawl 55 and one inner wall 56a of cutout 56 shown in FIG. 13, for example, due to the self-restoring force to the release position of the brake devices 20 and the biasing force of the lever return spring 29. That is, the brake lock mechanism 50 is maintained in the locking state. When, in this state, the brake lever 21 rocked slightly in a brake applying direction to swing the brake control elements 26, the locking pawl 55 disengages from the cutout 56 due to camming action of the other inner wall 56b of cutout 56 having a gentler inclination angle than the one inner wall 56a, as shown in FIG. 13, for example, and due to the force of pedal return spring 41. The lock link 53 thereby terminates the stopper action on the lock plate 54. That is, the brake lock mechanism 50 in the locking state may be switched to a lock releasing state by operating the brake lever 21.

In short, when the brake lever 21 and brake pedal 22 are in the inoperative positions "off" the brake control device BC is in the state shown in FIG. 9.

The brake lever 21 may be rocked about the axis of rotary transmission shaft 24 against the lever return spring 29, from the release position "off" to the operative position "on" rearward along a lever guide groove 61 formed in a rear wheel fender 60. Then, its lever operating force is transmitted through the brake control element 26 connected directly to the brake lever 21, stroke adjusting spring 32 and brake rod 30 to the control element 20a of brake device 20 for the left rear wheel, and through the rotary interlocking shaft 24, right brake control element 26, stroke adjusting spring 32 and brake rod 30 to the control element 20a of brake device 20 for the right rear wheel. The respective control elements 20a are thereby swung to the brake applying position for operating the brake devices 20 to brake the left and right rear wheels 2. At this time, the interlocking pin 27 of the brake control element 26 moves relative to the interlocking plate 43 along the slot 43a formed therein to break transmission of the lever operating force to the brake pedal 22. Thus, instead of moving in response to the brake lever 21, the brake pedal 22 is maintained in the release position "off" by the pedal return spring 41. Then, the lock checking element 39 is pressed against the release portion 53a of lock link 53 by the pedal return spring 41. The lock link 53 is thereby maintained, against the lock spring 57, in the position out of engagement with the lock plate 54. The brake lock mechanism 50 is maintained in the lock release state not locking the two brake devices 20 or the brake lever 21 to the operative positions. As a result, when the brake lever 21 is freed from the rocking force applied thereto rearwardly of the vehicle body, the brake lever 21 automatically returns to the inoperative position "off" under the force of lever return spring 29. The two brake devices 20 return to the inoperative positions under the self-restoring force. The left and right rear wheels 2 are released from the braking action.

Thus, the brake lever 21 is operable to apply traveling brakes to the left and right rear wheels 2 without locking the two brake devices 20 to the operative positions.

As shown in FIG. 11, the brake pedal 22 may be depressed against the force of pedal return spring 41 from the release position "off" to the operative position "on". Then, its operating force is transmitted to the interlocking pin 27 through the pedal support 35, interlocking arm 38 and interlocking plate 43 to swing the brake control element 26 connected directly to the brake lever 21. As in time of brake control by the brake lever 21, the torque of the brake control element 26 is transmitted to the control element 20a of brake device 20 for the left rear wheel and to the control element 20a of brake device 20 for the right rear wheel. The respective control elements 20a are thereby swung to the brake applying position for operating the brake devices 20 to brake the left and right rear wheels 2. At this time, the depression of brake pedal 22 results in the lock checking element 39 moving away from the release portion 53a of lock link 53 to remove the pressure applied to the lock link 53. Thus, as the brake devices 20 are placed in the operative position, the brake lock mechanism 50 automatically assumes the locking state under the force of lock spring 57 to retain both brake devices 20 in the operative position for locking the left and right rear wheel 2 to the braked state. When the depressing force is removed from the brake pedal 22 subsequently, as shown in FIG. 12, the brake pedal 22 is swung slightly toward the inoperative position "off" by the pedal return spring 41 and the slot 43a in the interlocking plate 43. The lock checking element 39 is maintained in the position contacting the release portion 53a of lock link 53 in the locking state.

Thus, even if the lock checking element 39 is pressed on the release portion 53a of lock link 53, the engagement between the locking pawl 55 and the inner wall 56a of cutout 56 in the lock plate 56 maintains the brake lock mechanism 50 in the locking state as noted hereinbefore, to maintain the brake devices 20 in the operative position.

In this locking state, the brake lever 21 may be rocked slightly rearwardly of the vehicle body. Then, the locking pawl 55 disengages from the cutout 56 due to camming action of the inner wall 56b of cutout 56. The brake pedal 22 is thereby released from the operative position "on", and the lock checking element 39, under the force of pedal return spring 41, maintains the lock link 53 in the position out of engagement with the lock plate 54. As a result, the brake lock mechanism 50 is switched to the lock release state to release the brake devices 20 and unlock the left and right rear wheel 2 from the braked state. The brake pedal 22 is restored to the inoperative position "off".

Thus, by operating the brake pedal 22 to place the brake devices 20 in the operative position, the brake lock mechanism 50 is automatically switched to the locking state to apply a parking brake to the left and right rear wheels 2. At this time, the brake lever 21 swings rearwardly of the vehicle body from the inoperative position "off" in response to the operation of brake pedal 22 since the brake control element 26 is interlocked to the brake pedal 22. The brake lock mechanism 50 maintains the brake lever 21 in the operative position "on" with the parking brake applied to the left and right rear wheels 2.

[Other Embodiments]

In the foregoing embodiment, the brake lever 21 is disposed at the left side of the driver's seat 4, and the brake pedal 22 at left end of the foot-rest 5a. Instead, one of the brake lever 21 and brake pedal 22 may be disposed to the left, and the other to the right. The brake pedal 22 may be disposed in a middle position transversely of the foot-rest 5a.

The foregoing embodiment employs the pair of brake devices 20 for acting on the left and right rear wheels 2, respectively. Instead, one brake device 20 may be employed to act on both the left and right rear wheels 2.

Besides the tractor having traveling wheels 2, this invention is applicable also to a mowing machine having a crawler type running device. These wheels 2 and crawler type running device are collectively called running device 2 herein.

What is claimed is:

1. A riding tractor in which engine output is transmitted to a running device through a hydrostatic stepless transmission, comprising:

a brake device for acting on said running device;

a first brake operating device for operating said brake device;

a second brake operating device operable independently of said first brake operating device for operating said brake device;

a lost motion mechanism provided between said first brake operating device and said second brake operating device, said lost motion mechanism being operable not to transmit a control displacement of said first brake operating device to said second brake operating device when said first brake operating device operates said brake device; and a brake lock mechanism movable with said first and second brake operating devices, and switchable between a locking state for locking said brake device to a braking position, and a lock release state for unlocking said brake device from said braking position, wherein said brake lock mechanism in said lock release state maintains said lock release state when only said first brake operating device operates said brake device to said braking position and automatically switches from said lock release state to said locking state when said first brake operating device and said second brake operating device operate said brake device to said braking position, and said brake lock mechanism in said locking position is switchable to said lock release position by the control displacement of said first brake operating device.

2. A riding tractor as defined in claim 1, wherein said brake device has a displacement transmitting brake rod extending therefrom forwardly of a vehicle body, said first brake operating device has a first displacement transmitting member connected thereto, and said second brake operating device has a second displacement transmitting member connected thereto, said displacement transmitting brake rod and said first and second displacement transmitting members being connected to a brake control element with displacement play in between.

3. A riding tractor as defined in claim 1, wherein said first brake operating device is disposed laterally of a driver's seat, and said second brake operating device is disposed in a foot area of a driver seated on said driver's seat.

4. A riding tractor as defined in claim 1, wherein said first brake operating device is a brake lever for applying a traveling brake to said running device, and said second brake operating device is a brake pedal for applying a parking brake to said running device.

5. A riding tractor as defined in claim 1, wherein:

said brake lock mechanism includes a locking pawl associated with said first brake operating device and a cutout associated with said second brake operating device, engaging said locking pawl with said cutout establishes said locking state of said brake lock mechanism, and disengaging said locking pawl from said cutout establishes said lock release state of said brake lock mechanism.

6. A riding tractor as defined in claim 1, wherein said second brake operating device includes a lock checking element, said lock checking element prevents a switchover of said brake lock mechanism from said lock release state to said locking state when said first brake operating device operates said brake device to said braking position while said second brake operating device does not operate said brake device to said braking position.

7. A riding tractor as defined in claim 1, wherein once said brake lock mechanism is switched to said locking state, said locking state is maintained after said second brake operating device quits operating said brake device to said braking position.

8. A riding tractor in which engine output is transmitted to a running device through a hydrostatic stepless transmission and mounting a driver's seat thereon, said riding tractor comprising:

a brake device for acting on said running device;

a brake lever disposed laterally of said driver's seat for operating said brake device;

a brake pedal disposed in a foot area of a driver seated on said driver's seat and operable independently of said brake lever for operating said brake device;

a lost motion mechanism provided between said brake lever and said brake pedal, said lost motion mechanism being operable not to transmit a control displacement of said brake lever to said brake pedal when said brake lever operates said brake device; and a brake lock mechanism movable with said brake lever and said brake pedal and switchable between a locking state for locking said brake device to a braking position and a lock release state for unlocking said brake device from said braking position, wherein said brake lock mechanism in said lock release state maintains said lock release state when only said brake lever operates said brake device to said braking position and automatically switches from said lock release state to said locking state when said brake lever and said brake pedal operate said brake device to said braking position, and said brake lock mechanism in said locking state is switchable to said lock release state by a control displacement of said brake lever.

9. A riding tractor as defined in claim 8, wherein:

said brake device has a displacement transmitting brake rod extending therefrom forwardly of a vehicle body, said brake lever has a first displacement transmitting member connected thereto, said brake pedal has a second displacement transmitting member connected thereto, and said displacement transmitting brake rod and said first and second displacement transmitting members are connected to a brake control element with displacement play in between.

10. A riding tractor as defined in claim 8, wherein said brake pedal is a parking brake pedal for applying a parking brake force to said running device.

11. A riding tractor as defined in claim 8, wherein:

said brake lock mechanism includes a locking pawl associated with said brake lever and a cutout associated with said brake pedal, and engaging said locking pawl with said cutout establishes said locking state of said brake lock mechanism, and disengaging said locking pawl from said cutout establishes said lock release state of said brake lock mechanism.

12. A riding tractor as defined in claim 8, wherein said brake pedal includes a lock checking element, said lock checking element prevents a switchover of said brake lock mechanism from said lock release state to said locking state when said brake lever operates said brake device to said braking position while said brake pedal does not operate said brake device to said braking position.

13. A riding tractor as defined in claim 8, wherein once said brake lock mechanism is switched to said locking state, said locking state is maintained after said brake pedal quits operating said brake device to said braking position.

* * * * *